United States Patent
Lin et al.

(10) Patent No.: US 8,738,467 B2
(45) Date of Patent: May 27, 2014

(54) CLUSTER-BASED SCALABLE COLLABORATIVE FILTERING

(75) Inventors: Chenxi Lin, Beijing (CN); Gui-Rong Xue, Beijing (CN); Hua-Jun Zeng, Beijing (CN); Zheng Chen, Beijing (CN); Benyu Zhang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1140 days.

(21) Appl. No.: 11/377,480

(22) Filed: Mar. 16, 2006

(65) Prior Publication Data

US 2007/0239554 A1  Oct. 11, 2007

(51) Int. Cl.
*G06Q 30/00* (2012.01)

(52) U.S. Cl.
USPC ..... 705/26.7; 705/26.1; 705/14.1; 705/14.14; 705/14.37; 705/14.39; 705/14.53; 705/14.66; 705/319; 705/347

(58) Field of Classification Search
USPC .......... 705/10, 14, 26, 26.1, 14.1, 14.53, 705/14.14, 14.37, 14.39, 14.66, 319, 347, 705/26.7
See application file for complete search history.

(56) References Cited

U.S. PATENT DOCUMENTS

| | | | |
|---|---|---|---|
| 5,872,850 A * | 2/1999 | Klein et al. ............... 705/51 |
| 5,884,282 A * | 3/1999 | Robinson .................. 705/7.33 |
| 6,041,311 A * | 3/2000 | Chislenko et al. ........ 705/26.7 |
| 6,049,777 A | 4/2000 | Sheena et al. |
| 6,092,049 A | 7/2000 | Chislenko et al. |
| 6,112,186 A | 8/2000 | Bergh et al. |
| 6,356,879 B2 * | 3/2002 | Aggarwal et al. ............. 705/26 |
| 6,460,036 B1 * | 10/2002 | Herz ............................. 707/10 |
| 7,590,636 B1 | 9/2009 | Heumann et al. |
| 2001/0014868 A1 * | 8/2001 | Herz et al. ................... 705/14 |
| 2002/0029162 A1 * | 3/2002 | Mascarenhas ............... 705/10 |
| 2003/0033436 A1 * | 2/2003 | Weiss .......................... 709/310 |
| 2003/0055816 A1 | 3/2003 | Paine et al. |
| 2004/0054572 A1 * | 3/2004 | Oldale et al. ................. 705/10 |
| 2009/0281877 A1 * | 11/2009 | Bezos et al. .................. 705/10 |

OTHER PUBLICATIONS

Office Action for U.S. Appl. No. 11/377,130, mailed on Jul. 20, 2011, Chenxi Lin, "Collaborative Filtering Using Cluster-Based Smoothing" 13 pages.

Office Action for U.S. Appl. No. 11/377,130, mailed on Jan. 3, 2012, Chenxi Lin, "Collaborative Filtering Using Cluster-Based Smoothing", 12 pgs.

* cited by examiner

*Primary Examiner* — Yogesh C Garg

(74) *Attorney, Agent, or Firm* — Carole Boelitz; Micky Minhas; Lee & Hayes

(57) ABSTRACT

Methods for determining a predictive rating are disclosed. In an embodiment, an active user is compared to a set of clusters. One or more of the clusters are determined to be most similar to the active user. From the one or more clusters, K users are determined to be most similar to the active user. Prior ratings for an item by the K users may be used to predict a rating for the item for the active user.

20 Claims, 8 Drawing Sheets

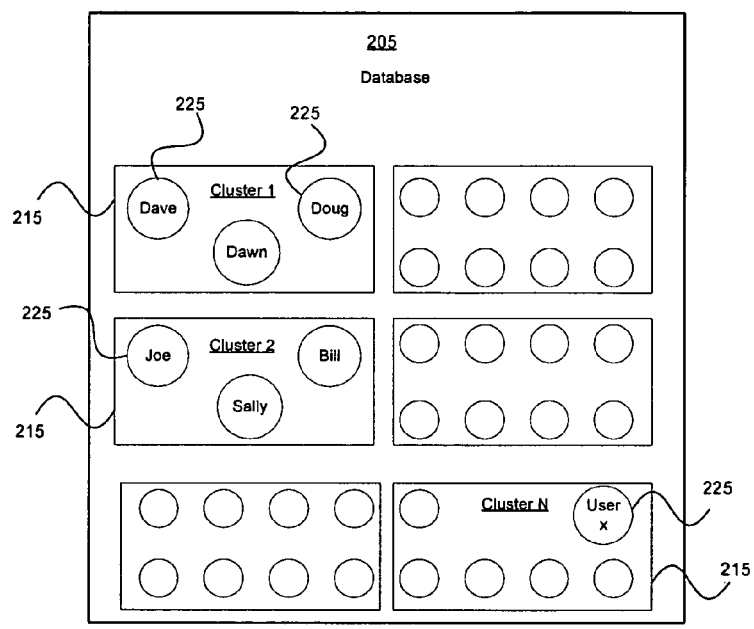
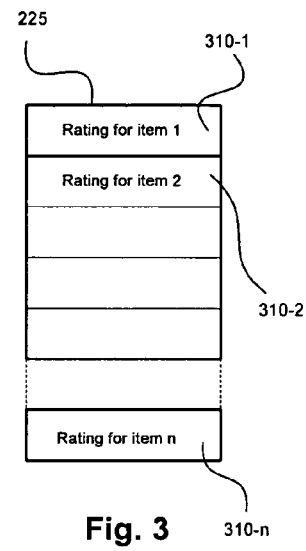
Fig. 2
Fig. 3

CLUSTER-BASED SCALABLE COLLABORATIVE FILTERING

BACKGROUND

The widespread availability of the Internet has lead to an explosion of available information. For example, a search for information may turn up a very large number of possible hits. Another result of the widespread availability of the Internet is that any company in the world can easily become a global company by posting information on a website. While this is advantageous as it presents a large number of choices to consumers, the sheer number of choices can make it difficult for an individual. Research suggests that if the number of choices increases beyond a certain point, consumers become paralyzed trying to decide between the various choices. For example, an individual searching for a class of product, such as a portable media player, would discover a large number of possible choices, each with certain advantages and disadvantages. Trying to decide which set of advantages and disadvantages is the best fit for the individual may be difficult. Therefore, to aid in these areas, collaborative filtering may be used.

Collaborative filtering can predict what is a close match to an active user's request for information based on results or ratings of similar requests by like-minded users. The basic idea is that the active user will prefer those items that like-minded people prefer, or that dissimilar people do not prefer.

Two basic types of algorithms for collaborative filtering have been studied: memory-based and model-based. Memory-based algorithms compare an active user to the entire database of users to identify the top K most similar users to the active user from a database in terms of the rating patterns. Once the top K users are determined, the ratings of the K users may be used to provide a recommendation for the active user.

Unlike memory-based approaches, model-based approaches group different users in the database into a small number of classes based on their rating patterns. In order to predict the rating for an active user on an item of interest, these approaches first categorize the active user into one or more of the predefined user classes and then use the rating of the predefined user classes to determine a prediction for the item of interest.

While these basic approaches have been somewhat effective, improved methods of collaborative filtering would be beneficial.

SUMMARY

Methods of collaborative filtering are disclosed. Based on the ratings previously made by an active user, one or more clusters can be selected from a set of clusters, the one or more clusters being most similar to the active user. From the one or more clusters, K users that are most similar to the active user may be selected. Ratings for a first item that are associated with the K users can be used to provide the active user a predictive rating for the first item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which:

FIG. 2 illustrates an embodiment of a set of clusters that may be used in accordance with one or more aspects of the present invention.

FIG. 3 illustrates an embodiment a user data structure of that may be used in accordance with one or more aspects of the present invention.

DETAILED DESCRIPTION

Figure 1:
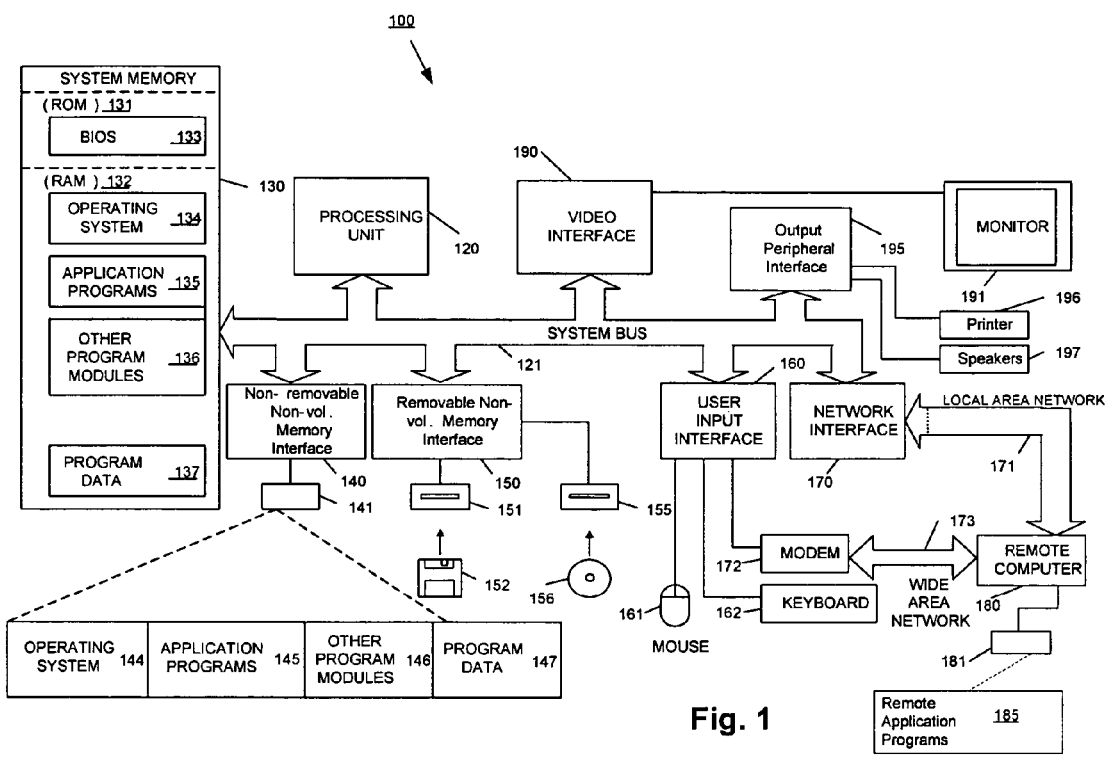
FIG. 1 illustrates a schematic diagram of an exemplary general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Before discussing the exemplary embodiments provided below, it should be noted that memory-based methods discussed above suffer from two fundamental problems: data sparsity and an inability to scale up. Data sparsity refers to the fact that many users only rate a small number of items and therefore the number of users that may have rated a particular product may be very small. Thus, if a grid of users versus items was made, a majority of the fields (which would represent the rating a particular user gave a particular item) may be blank. As a result, the accuracy of the memory-based method can be poor because it may be that like-minded users have not previously rated the item in question. Regarding the inability to scale, as the number of users increases, additional computation resources are required to search all the users to find the K closest users. Thus, a memory-based method may be poorly suited to predicting results for an active user when there are a large numbers of users and/or a large numbers of items to evaluate. While the model-based method, which can include a Bayesian network approach, a clustering approach and aspect models, tends to scale more readily, the model-based approaches cannot cover as diverse a user range as the memory-based approaches can.

Turning to FIGS. 2 and 3, a database 205 of users 225 is depicted, where each of the users is in a cluster 215. For example, users Dave, Dawn and Doug are depicted as being in cluster 1. As can be appreciated, the number of users in a cluster may vary, depending, at least in part, on the number of clusters used to sort the users in the database. Furthermore, in an embodiment the number of users in each cluster may also vary. Each user 225 includes a set of ratings 310-1, 310-2, . . . 310-$n$ for items 1, 2 . . . n. The items may be products, services, businesses or any other thing that is amendable to being rated. As can be appreciated, however, each user 225 may not have a rating value for all 310-1 through 310-$n$ items. Thus, user Dave in cluster 1 may not have a rating value for item 1 and user Bill in cluster 2 may not have a rating value for item 3.

The possibility that a user has not rated all items relates to data sparsity and was discussed above. It should be noted that if the user has rated too few items, then it will be difficult to compare and classify the user as belong to a particular cluster, more of which will be discussed below. For example, it may be difficult to classify a first user as belonging to a cluster of users if that first user has only rated one or two items. However, as the number of items the first user rates increases, attempts to classify the first user can be expected to be more successful.

Figure 10:
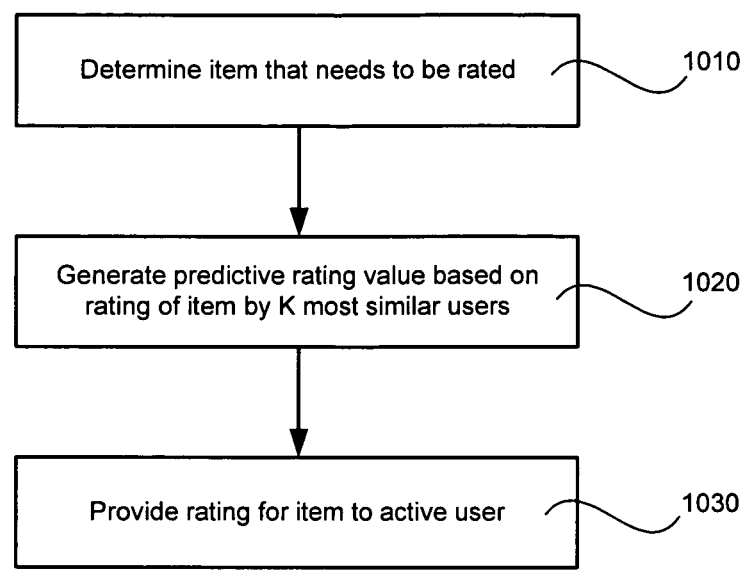
FIG. 10 illustrates a method of providing a rating to an active user that may be used in accordance with one or more aspects of the present invention.

Turning to FIG. 10, a basic method of providing a predictive rating is disclosed. In step 1010, the item that needs a rating is determined. As will be discussed below, this can be in response to a request for information about that item or it can be a response to some input provided by an active user that is somehow related to the item. Next in step 1020, a predictive rating is determined for the item based on ratings made by like-minded users. Various methods for providing such a predictive rating will be discussed in detail below. It should be noted that various steps of the different methods may be omitted and or combined and other steps may added so as to provide the desired performance versus computational resource consumption. In step 1030, the predictive rating is provided to the active user.

It should be noted that the term active user means the user that is currently providing input that triggers the need for the predictive rating based on users in the database.

Regarding the users in the database, as can be appreciated, each user has a pattern of ratings. Some of the users will rate a large number of items and, therefore, will have a more complete pattern that is helpful in predicting what other like-minded users would prefer. However, a user with a single rating is less useful in predicting what other users would prefer because it is difficult to compare a first user to other users based on one point of comparison. Therefore, some amount of information about the user may be required from the user before the user can be included in the database. In such an embodiment, some of the items depicted in FIG. 3 may represent demographic information about the user. Alternatively, the user may be placed in the user database after a predetermined number of ratings are made by the user.

As the number of users and items that can be rated increases, it can become difficult to evaluate all ratings made by all the users in a timely manner. To improve timeliness, once the users are added to the database, they can be sorted into clusters. For purpose of discussion, the set of all the users may be represented by U={U$_{(1)}$, U$_{(2)}$, . . . u$_{(n)}$} and the items by T={t$_{(1)}$, t$_{(2)}$, . . . t$_{(m)}$}. Each user may have a rating r for each item. Thus, the tuple (u$_{(1)}$, t$_{(1)}$, r$_{(1)}$) represents the rating made by user 1 for item 1. The tuple may be generically represented by R$_u$(t) which is the rating of item t by user u. Assuming the use has rated more than one item, an average user rating can be determined. In the discussion that follows, $\overline{R_u}$ represents the average rating of user u and the value may be obtained by summing all the ratings made by the user u and dividing that value by the number of ratings made.

Figure 5:
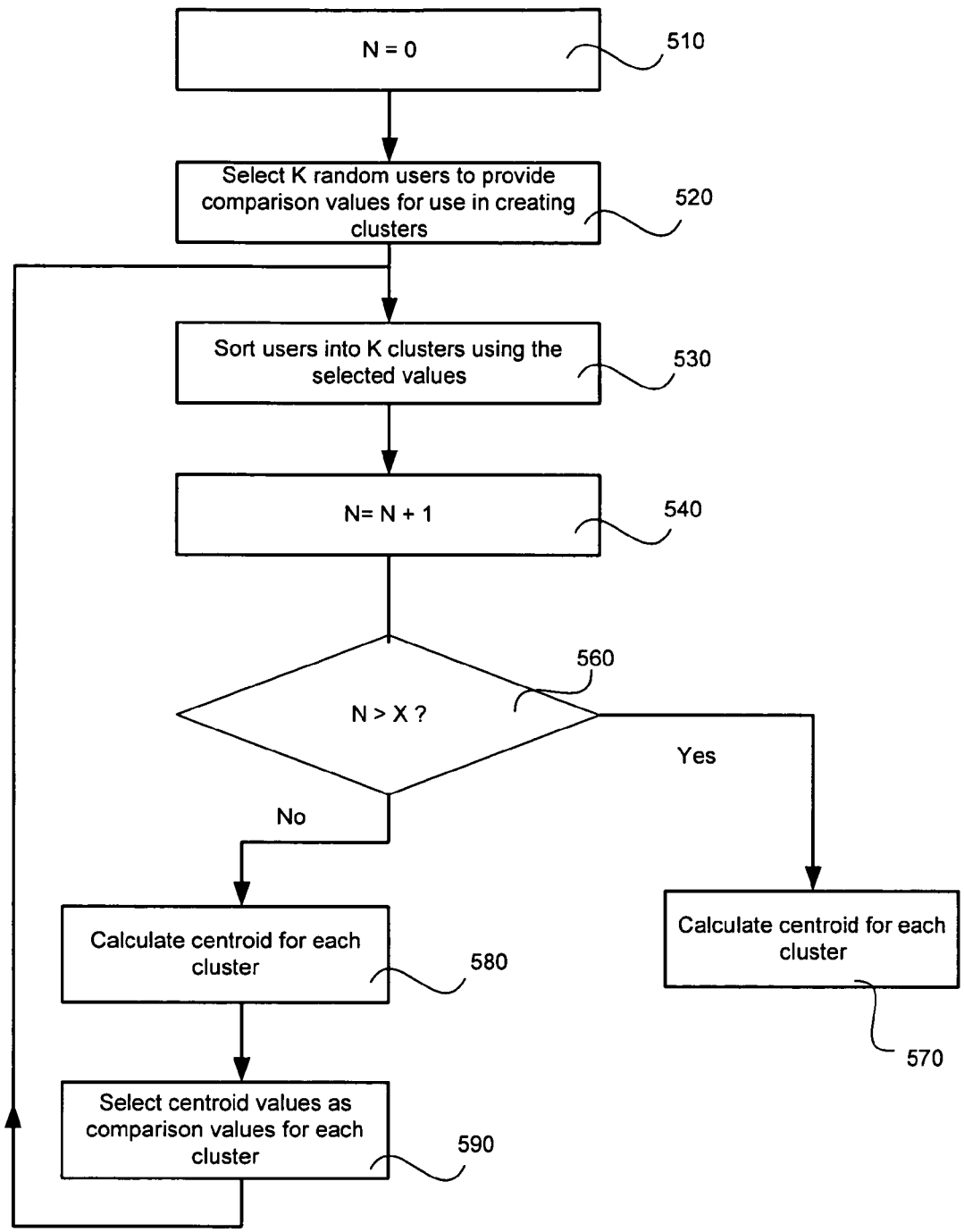
FIG. 5 illustrates a method of sorting a database of users into clusters that may be used in accordance with one or more aspects of the present invention.

Turning to FIG. 5, an embodiment of a sorting method based on a k-means algorithm is illustrated. It should be noted that any other suitable sorting algorithm may also be used in place of the k-means algorithm. First in step 510, a counter N is set to zero. Next in step 520, K users are selected at random, where K is an integer that represents the number of clusters that are desired. K may be predetermined and if clusters of a certain size are desired, the number of users can be divided by the desired size of cluster to determine how many clusters should be formed and that number may be set as K. As can be appreciated, an overly small number of clusters, such as 1 or 2, is less desirable because too many users that are not that similar tend to be included in each cluster. On the other hand, at some point additional clusters do not improve the accuracy of predicting a rating and only waste computational resources. Therefore, in an embodiment the appropriate value for K may be determined through an iterative process that may depend, at least in part, on the number of total users and the number of items being rated.

Once the number of clusters is determined, in step 530 the users are sorted into clusters based on their similarity to each of the K users. To determine the similarity, the Pearson correlation-coefficient may be used. For example, the following equation may be used to determine the similarity between users u and u', where u' is one of the randomly selected users being used to generate one of the clusters:

$$sim_{u,u'} = \frac{\sum_{t \in T(u) \wedge T(u')} (R_u(t) - \overline{R_u}) \cdot (R_{u'}(t) - \overline{R_{u'}})}{\sqrt{\sum_{t \in T(u) \wedge T(u')} (R_u(t) - \overline{R_u})^2} \sqrt{\sum_{t \in T(u) \wedge T(u')} (R_{u'}(t) - \overline{R_{u'}})^2}}$$

As can be appreciated from the above equation, only the items that are rated by both user u and user u' are compared. Each user u is compared to all the randomly selected users u' that represent the K clusters and the user u may placed in the cluster that is most similar to the user u. It should be noted that as the average user rating is subtracted from the user's rating for a particular item t, the ratings of users are effectively normalized so a user that that rarely rates higher than a 7 on a 10 point scale may be found similar to user that rarely rates below 6 on a 10 point scale. However, other known methods of comparing two users may be used, including without limitation, a vector similarity-based approach, and an extended generalized vector-space model. In addition, there is no need to normalize the user's ratings.

Next in step 540, the counter N is incremented. In step 560, a check is made to see if N is greater than X. If N is great than X, then in step 570 the centroid for the cluster can be determined. In an embodiment, the centroid can be the average rating of all the users for each item.

If N is not greater than X, then in step 580 the mean rating value for each item is determined for each cluster. Then in step 590, the cluster mean rating value for each item is selected so as to generate a representative user for the cluster. Then step 530 is repeated. As can be appreciated, as the mean rating value for each item is likely to be different than the rating values for the randomly selected user, repeating step 530 typically will result in each of the K clusters having a new set of users. In an embodiment, the iterative process may converge.

As can be appreciated, X is the number of iterations that will be used to optimize the clustering of users. X can be any number that is determined to be effective for a particular set of users. For example without limitation, X may be 5, 10, 20 or some other positive integer. While a larger value of X is more likely to result in a convergence, it should be noted that if X is overly large, the result will be a waste of computational resources because at some point any changes resulting from an additional iteration would be so minor as to be considered insignificant.

Once the users are sorted into clusters, the centroid for the cluster can be determined. The centroid represents the average rating value for each item, based on all the users in the cluster that have rated the item.

Figure 4:
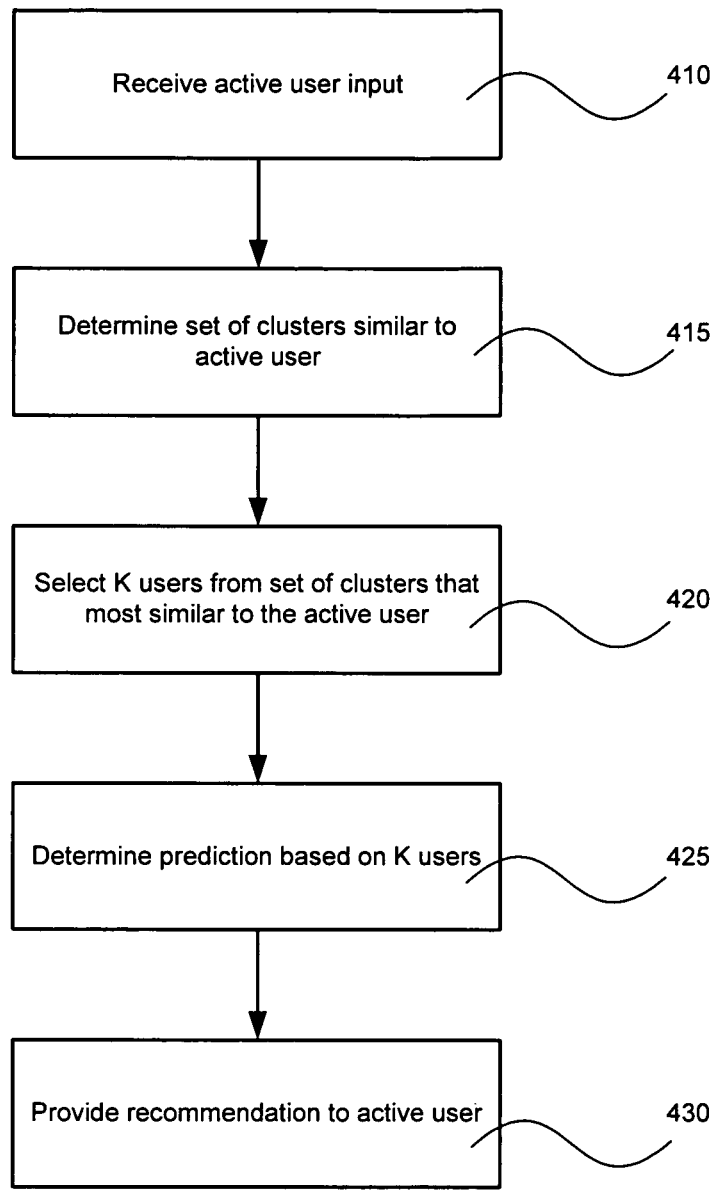
FIG. 4 illustrates a method of providing a recommendation to an active user that may be used in accordance with one or more aspects of the present invention.

The process of sorting users into clusters may occur offline in preparation for input provided by an active user. Once input is provided by the active user, a rating prediction can be provided. FIG. 4 illustrates a method of providing a rating prediction. First in step 410, an input is received from an active user $u_a$. The input provides an opportunity to provide a rating prediction to the active user $u_a$. While numerous reasons exist for providing a rating prediction, the following are representative of possible reasons to provide a rating prediction: the input includes a request for a rating prediction about a product, the input requests information about a product, the input is a search regarding a class of product, the input is a purchase of a product and the input is a purchase of a product related to one or more products contained within the user/item database. Numerous other motivations for providing a rating prediction are possible and the above examples are not intended to be limiting.

In step 415, the clusters are compared to the active user to determine a subset of clusters (the subset may include one or more clusters) that are closest to the active user $u_a$. In an embodiment, the following equation may be used to determine which clusters are closest to the active user $u_a$:

$$sim_{u_a,C} = \frac{\sum_{t \in T(u_a) \land T(C)} \Delta R_C(t) \cdot (R_{u_a}(t) - \overline{R_{u_a}})}{\sqrt{\sum_{t \in T(u_a) \land T(C)} (\Delta R_C(t))^2} \sqrt{\sum_{t \in T(u_a) \land T(C)} (R_{u_a}(t) - \overline{R_{u_a}})^2}}$$

In the above equation, $\Delta R_C(t)$ represents the average deviation in the ratings for item t for all the users that rated t. As can be appreciated, only the items that the active user $u_a$ has rated are used to determine which cluster is the most similar. Thus, an active user that has only rated one or two items may find the results less accurate then desirable because of the limited ability to compare users in the data to the active user. As noted above, $\Delta R_C(t)$ represents the average deviation in the ratings for t for all the users that rated t and is defined by the following equation:

$$\Delta R_C(t) = \sum_{u \in C(t)} (R_u(t) - \overline{R_u}) / |C(t)|$$

In the above equation, $C(t)$ is the set of users that have rated the item t and $|C(t)|$ is the number of users.

Once the subset of clusters that is similar to the active user $u_a$ is determined, in step 420 the K users most similar to the active user $u_a$ may be determined from the subset of clusters. In an embodiment, the K most similar users may be determined with the following equation, where $R_{u_a}(t)$ is the rating of the active user for the item t and $\overline{R_{u_a}}$ is the active user's average rating:

$$sim_{u_a,u} = \frac{\sum_{t \in T(u_a)} (R_u(t) - \overline{R_u}) \cdot (R_{u_a}(t) - \overline{R_{u_a}})}{\sqrt{\sum_{t \in T(u_a)} (R_u(t) - \overline{R_u})^2} \sqrt{\sum_{t \in T(u_a)} (R_{u_a}(t) - \overline{R_{u_a}})^2}}$$

As can be appreciated, the items that the active user $u_a$ has rated are used to determine the similarity of the active user to the users u in the subset of clusters and a greater value indicates an increased similarity.

Once the K most similar users are determined, in step 425 a rating $R_{u_a}(t)$ for item t may be predicted for the active user $u_a$. In an embodiment, the following equation may be used:

$$R_{u_a}(t) = \overline{R_{u_a}} + \frac{\sum_{i=1}^{K} sim_{u_a,u} \cdot (R_u(t) - \overline{R_u})}{\sum_{i=1}^{K} sim_{u_a,u}}$$

In the above equation, $\overline{R_{u_a}}$ equal the average rating value of the active user $u_a$, $R_u(t)$ is the user $u_i$'s rating for item t, $\overline{R_u}$ is the user $u_i$'s average rating, K is the number of users being compared to the active user and $sim_{u_a,u}$, is as defined above. Thus, the above equation adds the deviation in rating for the item t for the K users to the average rating $\overline{R_{u_a}}$ of the active user. As can be appreciated, the more similar one of the K users $u_i$ is to the active user, relative to the remaining K users, the greater the influence that user $u_i$ will have on the overall value that will be added to the active user's average rating value $\overline{R_{u_a}}$. As can be appreciated, in the above depicted embodiment only the users that rated the item t are used to provide a predictive rating for the item t.

While the above method provides a rapid and effective means of providing a rating prediction to an active user, addition steps may provide an improved prediction, at the cost of additional computational resources. As noted above, each user will have rated at least one item but relatively few, if any, users will have rated all the items. Therefore, in an embodiment, a method depicted in FIG. 6 may be used to address issues of data sparsity.

First in step 610 the users are sorted into K clusters. As discussed above, a k-means algorithm may be used but other clustering methods such as expectation maximization clustering or hierarchical clustering or some other clustering method may also be used. In addition, if k-means clustering or expectation maximization clustering are used, the number of clusters may be determined using a v-fold cross-validation algorithm, in a known manner.

Next in step 615, the data is smoothed. As discussed above, for each user and item combination, a rating may exist. However, not all the users are likely to rate all the items, therefore, a blank or null rating $R_u(t)$ for some of the users and item combinations will likely exist. In practice, more null values than rating values are expected. To smooth the data, the rating $R_u(t)$ for all user/item combinations can be set equal to the follow equation:

$$R_u(t) = \begin{cases} R_u(t) & \text{if user } u \text{ rated the item } t \\ \hat{R}_u(t) & \text{else} \end{cases}$$

Thus, if the user has rated an item then the user's rating is preserved, and if the user has not rated the item, then the user's rating is set to $\hat{R}_u(t)$ which represents the smoothed value for the user u's rating of the item t and is defined by the equation:

$$\hat{R}_u(t) = \overline{R_u} + \Delta R_{C_u}(t)$$

Thus, $\hat{R}_u(t)$ is equal to the user's average rating $\overline{R_u}$ plus some value $\Delta R_{C_u}(t)$. In turn, $\Delta R_{C_a}(t)$ is the average deviation rating for all users in the cluster CU for the item t and is defined by the following equation:

$$\Delta R_{C_u}(t) = \sum_{u' \in C_u(t)} (R_{u'}(t) - \overline{R_{u'}}) / |C_u(t)|$$

In the above equation, $C_u(t)$ is a set of all the users in cluster that have rated the item t and $|C_u(t)|$ is the number of users in the set. Thus, for each item t, the value each user has given the item t minus that user's average rate rating is determined and the value is divided by the number of users that have rated the item t. This value is summed with all the other similar values to provide the average deviation for that item. Thus, if the users in the cluster generally rated item t as being below their average rating $\overline{R_u}$, then the value for $\Delta R_{C_u}(t)$ will be a negative value so that the user u's rating $R_u(t)$ is also below user u's average rating $\overline{R_u}$. Conversely, if the users in the cluster tended to rate item t above their average rating, the value for $\Delta R_{C_u}(t)$ will be positive and the rating RU (t) for the item t by the user u will be greater than $\overline{R_u}$. As can be appreciated, an advantage of this method is that the individuality of each user is preserved. For example, if a user typically rates all items lower (representative of a more critical user), then the rating assigned to the item and user combination will be lower.

Figure 7:
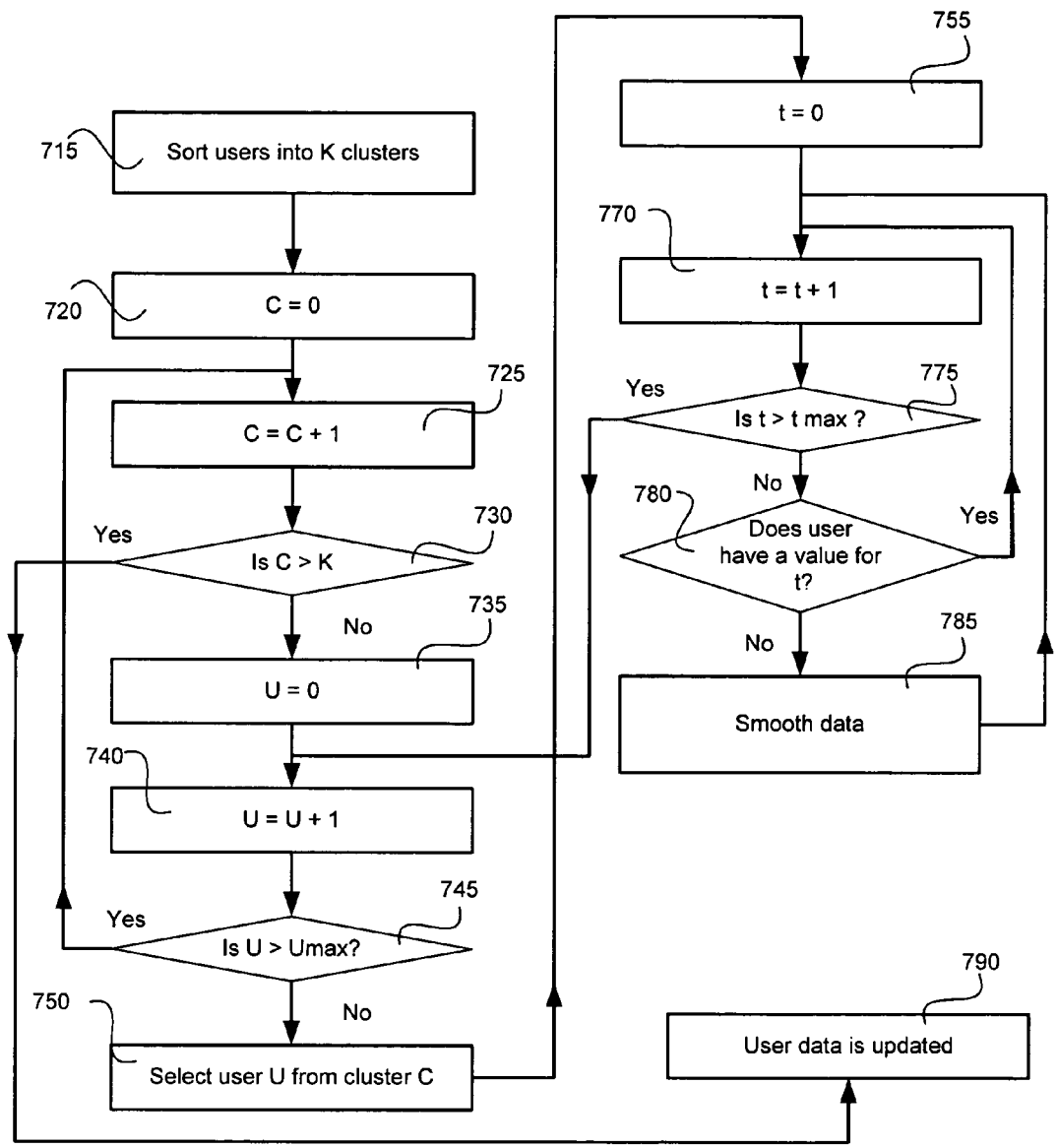
FIG. 7 illustrates a method of smoothing data that may be used in accordance with one or more aspects of the present invention.

FIG. 7 illustrates a basic method for smoothing the tuples in a cluster. First in step 715, the users are sorted into K clusters. This may be done as discussed above with a k-means algorithm or via some other known sorting algorithm. Next in step 720, counter C, which represents the cluster being worked on, is set to zero. Then in step 725 the counter is incremented by 1 (thus cluster $C_1$ is being considered). In step 730, a check is made to see if all K clusters have been processed. If all K clusters have been processed, then in step 790 an indication that the user data has been smoothed may be provided.

If all K clusters have not been processed, then in step 735 the user counter U is set equal to zero and then incremented in step 740. In step 745 a check is made to see if the all the users have been processed, and if they have step 725 is repeated. If additional users in the cluster still need to be processed, in step 750 user U is selected from cluster C. In step 755 counter t (representing the items) is set equal to zero and then incremented in step 770. In step 775, a check is made to see if all the items for user U have been processed and if they have, the user counter U is incremented in step 740. If additional items t need to be processed, in step 780 a check is made as to whether the user has rated the item t. If the user has rated item t, then in step 770 the item t is incremented.

If the user has not rated the item t, then in step 785 the rating for item t for user U is smoothed. In an embodiment, the data smoothing may be as discussed above.

Additional methods of data smoothing are also possible. In an embodiment, the average value of all the rating for all items could be determined along with the average rating value for item t. The difference could be added to the user u's average rating $\overline{R_u}$. In an alternative embodiment, the average rating $\overline{R_u}$ and the standard deviation of rating for each user could be determined. Then, the number of standard deviations that the rating $R_u(t)$ represented compared to $\overline{R_u}$ could be determined. For example, if a user's rating had a standard deviation of 1, then a rating of 2 higher than the user's average rating would be a rating that was two standard deviations. As can be appreciated, the average standard deviation of all the users could be applied to the user u to account for the individual user's tendency to rate things. Thus, as can be appreciated, variations in data smoothing are possible and are within the scope of the present invention.

Regardless of the method used to smooth the data, once the data is smoothed, the centroid of each cluster may be determined as discussed above. It should be noted that the data may be smoothed off-line so as to not delay providing predictive ratings in response to user requests.

Figure 6:
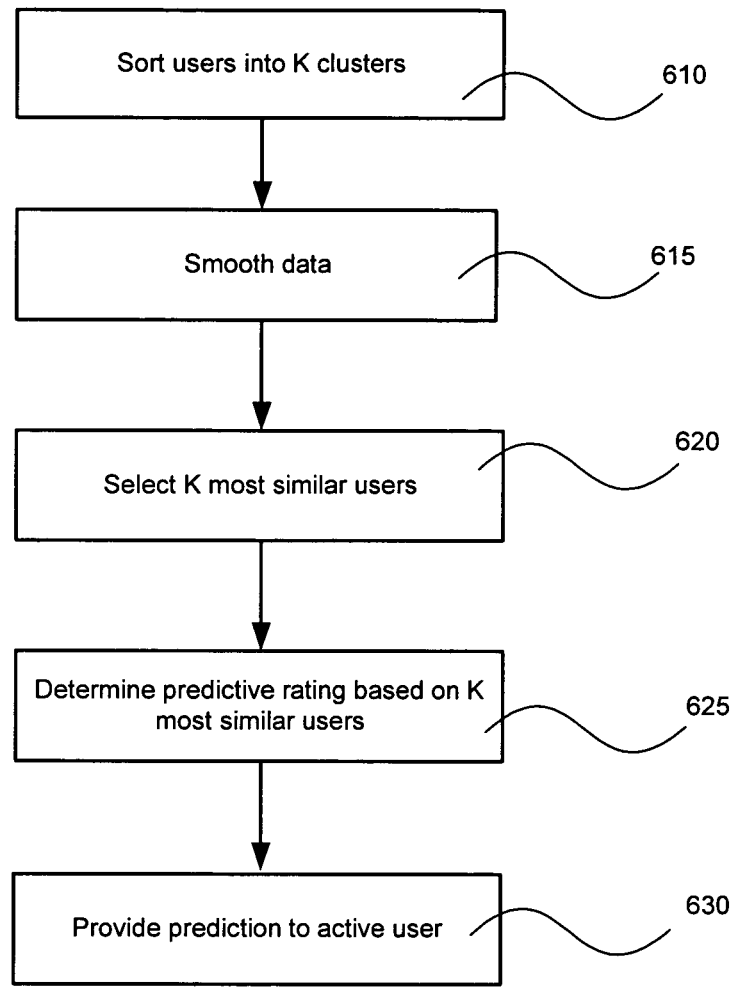
FIG. 6 illustrates a method of providing a predictive rating to an active user that may be used in accordance with one or more aspects of the present invention.

Continuing with FIG. 6, in step 620 the K users most similar to the active user are determined. In an embodiment the K users may be determined from the entire set of users. As can be appreciated, this is expected to provide maximum the most similar K users in the data set. In an alternative embodiment, the K users may be selected from a subset of clusters as discussed above.

In either case, when selecting the K users that are most similar to the active user, the fact that the data was smoothed may be taken into account. In an embodiment, the rating for each item by each users can be assigned a confidence value $w_{ut}$ where $w_{ut}$ is defined by the following equation:

$$w_{ut} = \begin{cases} 1 - \lambda & \text{if user } u \text{ rated the item } t \\ \lambda & \text{else} \end{cases}$$

The value for $\lambda$ may range between zero and one. The K users that are most similar may then be selected with the following equation:

$$sim_{u_a, u} = \frac{\sum_{t \in T(u_a)} w_{ut} \cdot (R_u(t) - \overline{R_u}) \cdot (R_{u_a}(t) - \overline{R_{u_a}})}{\sqrt{\sum_{t \in T(u_a)} w_{ut}^2 \cdot (R_u(t) - \overline{R_u})^2} \sqrt{\sum_{t \in T(u_a)} (R_{u_a}(t) - \overline{R_{u_a}})^2}}$$

As can be appreciated, if λ is zero then the equation functions as though the data was not smoothed. If λ is set equal to one, then the equation uses the average rating of the cluster for similarity computation and prediction, similar to cluster-based collaborative filtering algorithms. To maximize performance, however, a value of about 0.35 may be used for λ. As the value of λ increases above 0.35 more reliance is placed on the cluster determined value at the expense of the individual made ratings. On the other hand, as the value of λ decreases below 0.35 issues with data sparsity reduce the performance of the similarity determination.

Once the K most similar users are selected, in step 625 a predictive rating based on the K most similar users may be determined. In an embodiment, the following equation can be used to determine the predictive rating $R_{u_a}(t)$:

$$R_{u_a}(t) = \overline{R_{u_a}} + \frac{\sum_{i=1}^{K} w_{ut} \cdot sim_{u_a,u} \cdot (R_u(t) - \overline{R_u})}{\sum_{i=1}^{K} w_{ut} \cdot sim_{u_a,u}}$$

In the above equation, the $w_{ut}$ is as defined previously and $sim_{u_a,u}$ is the similarity between the user i and the active user $u_a$ provided above. It should be noted that if λ=0.35, then greater weight will be given to actual ratings versus smoothed data ratings. Next in step 630, the predictive rating is provided to the active user.

Figure 8:
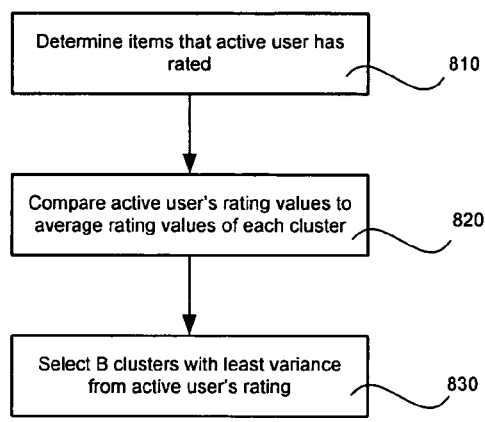
FIG. 8 illustrates a method of selecting clusters similar to an active user that may be used in accordance with one or more aspects of the present invention.

Looking now at FIG. 8, a generalized method of determining a subset of clusters is described. First in step 810, the ratings made by the user are determined. As can be appreciated, if the user has not made any prior ratings, then there are no data points available to use to compare the active users to users in the database. One method of addressing this is to collect additional data on the users such as demographic information. If the system was web-based, the demographic information may include previously visited websites and other common demographic information, if available, such as the age or profession or hobbies or financial status of the active user. While such information may be less successful in determining like-minded users in the database, if no other data is available it is expected to be better than the alternative. In an alternative embodiment, the user could be requested to enter certain data in order to use the predictive ratings and the entered data could be used to determine what users may be considered like-minded.

Next in step 820, the user's ratings are compared to average cluster ratings to determine which clusters are most similar to the active user. Then in step 830, the B closest clusters are selected. If the database is not overly large, selecting a sufficient number of clusters so as to include 30 percent of the total users is expected to provide the majority of the closest users. In such an example, if there were 20 total clusters then B could equal 6. However, some other percentage may also be used. For example, if the database includes a large number of users (for example, over a million) with a large number of items, then performance considerations may suggest selecting one or more clusters that still provides a sufficient number of like-minded users but with a much smaller percentage such as 0.5 or 1 or 2 percent.

Figure 9:
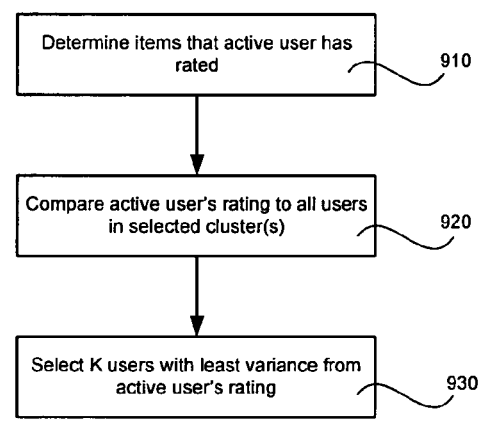
FIG. 9 illustrates a method of selecting K users from a set of selected clusters that may be used in accordance with one or more aspects of the present invention.

Looking at FIG. 9, a simplified method of determining K users is illustrated. First in step 910 the ratings the active user has made are determined. Then in step 920, the active user's ratings are compared to all the users in the selected cluster(s). If none of the clusters are pre-selected as being similar to the user, then all the clusters may be considered selected. Next in step 930, K users are selected as being the most similar to the active user. While the value for K may be selected based on an iterative process, in an embodiment the value may be twenty.

As noted above, FIG. 10 illustrates a basic method of providing a predictive rating and was discussed above. It should be noted that variations in how step 1030 is accomplished are possible. For example, as can be appreciated, the predictive rating can be provided by making a simple indication that the user is likely to prefer an item or it can be provided as method of ranking a number of items. In addition, if the active user was researching an alternative product, then the rating could be provided in the form of a something that the user might possibly enjoy. Alternatively, product advertisements could be provided based on the user's expected rating of one or more items. As can be appreciated, numerous variations are possible and are limited primarily by the computational resourced needed to predict the rating of one or more items and by the methods used to provide the rating(s) to the active user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. A computer-implemented method of providing a predictive recommendation for a first item to an active user based at least in part on ratings of the first item, the method comprising:
    selecting, by a computing device, from a set of N clusters comprising users, at least one cluster that is similar to the active user based at least in part on ratings of multiple items made by the users in the N clusters;
    from the at least one cluster, determining, by the computing device, based at least in part on ratings of the multiple items that have been rated by users in the at least one cluster, similarity values for users in the at least one cluster;
    identifying, by the computing device, based at least in part on the similarity values, K users that are similar to the active user, wherein each of the K users have provided a rating for the first item; and
    providing, by the computing device, the predictive recommendation for the first item to the active user based at least in part on determining:
        an average rating of the active user for the multiple items;
        an average rating of each of the K users for items that include at least a subset of the multiple items;
        for each of the K users, a difference between the rating for the first item and the average rating for the items that include at least a subset of the multiple items; and
        an addition that includes at least the average rating of the active user and the difference to form the predictive recommendation for the first item.

2. The method of claim 1, the providing further comprising:
    determining a summation of the difference multiplied by an associated similarity value for each of the K users;

determining a division of the summation divided by a summation of the associated similarity value for each of the K users; and determining the addition by further using an addition of the division and the average rating of the active user to form the predictive recommendation for the first item.

3. The method of claim 1, further comprising:
sorting the users into the set of N clusters in advance of the active user requesting information.

4. The method of claim 1, wherein the predictive recommendation is provided in response to an input provided by the active user.

5. The method of claim 4, wherein the input is a selection of the first item.

6. The method of claim 1, wherein the at least one cluster comprises at least 30% of a total number of the users in the N clusters.

7. A computer readable storage memory comprising computer executable instructions that, when executed by a processor, cause the processor to perform acts comprising:
sorting a database of users into N clusters based at least in part on ratings for items made by the users;
in response to receiving an input by an active user, determining a subset of the N clusters that are similar to the active user based at least in part on an average deviation of ratings for items made by the active user and users in the subset of the N clusters;
determining a similarity value for each of the users in the subset of the N clusters based at least in part on the ratings of the items;
selecting, from those users in the subset of the N clusters that have provided a rating for a first item that is not included in the items, K users in the subset of the N clusters that are closest to the active user based at least in part on the similarity value determined for each of the K users; and
providing a predictive rating for the first item to the active user based at least in part on determining:
an average rating of the active user for the items;
for each associated user of the K users, a difference between a rating made by the associated user for the first item and an average rating of the associated user for multiple items that include at least a subset of the items; and
a summation of the difference for each associated user of the K users added to the average rating of the active user for the items to form the predictive rating for the first item.

8. The computer readable storage memory of claim 7, wherein the sorting comprises:
using a K-means algorithm to sort the users into N clusters.

9. The computer readable storage memory of claim 7, wherein the determining the subset of the N clusters comprises:
selecting a number of clusters so as to include at least 30 percent of the total users in the subset of N clusters.

10. The computer readable storage memory of claim 7, wherein the determining the subset of the N clusters comprises:
determining a set of ratings associated with the active user;
determining the similarity of each of the N clusters to the active user; and
selecting a subset of the N clusters that are the most similar to the active user.

11. The computer readable storage memory of claim 10, wherein the determining the similarity of each of the N clusters to the active user comprises:

comparing the set of ratings associated with the active user to a centroid of each cluster.

12. The computer readable storage memory of claim 7, wherein the predictive rating is a recommendation to purchase the first item.

13. The computer readable storage memory of claim 12, wherein the input is a request for information regarding a second item related to the first item.

14. The computer readable storage memory of claim 7, wherein the determining similarity values used to select K users comprises:
determining a set of ratings associated with the active user; and
determining the similarity between the set of ratings associated with the active user and the ratings associated with each of the users in the subset of N clusters.

15. The computer readable storage memory of claim 7, wherein the providing the predictive rating is further based at least in part on determining:
a multiplication of the difference for each associated user of the K users by the corresponding similarity value for the associated user of the K users; and
a summation of the similarity value for each user of the K users.

16. A computer-implemented method of providing a predictive rating to an active user, the method comprising:
receiving, by a computing device, a request from the active user, the request associated with a first item;
selecting, by the computing device, from a set of clusters of users, at least one cluster that is most similar to the active user based at least in part on an average deviation of ratings for items made by the active user and users in the at least one cluster;
determining, by the computing device, a similarity value for each user in the at least one cluster based at least in part on the ratings for the items, the determining similarity values comprising:
calculating a difference, for each corresponding user of the at least one cluster, between a rating for each of the items that have been rated by the corresponding user, and an average rating of ratings made by the corresponding user for multiple items that include at least a subset of the items and one or more other items that differ from each of the items; and
calculating a difference, for the active user, between a rating for each of the items rated by the active user and an average rating for the items rated by the active user;
determining, by the computing device, from those users in the at least one cluster that have provided a rating for the first item, K users that are most similar to the active user based at least in part on the similarity value determined for each of the K users;
determining, by the computing device, a predictive rating for the first item based at least in part on ratings of the first item made by the K users, wherein each K user that is more similar to the active user relative to the remaining K users will have a greater influence on the predictive rating; and
providing, by the computing device, the predictive rating to the active user.

17. The method of claim 16, wherein the request received from the active user comprises a request for search results for a class of product.

18. The method of claim 16, wherein the selecting the at least one cluster comprises:
   determining ratings associated with the active user for each of the items;
   determining a similarity between the ratings associated with the active user and a centroid of each cluster in the set of clusters; and
   selecting the at least one cluster that has the centroid that is most similar to the ratings associated with the active user.

19. The method of claim 18, wherein the centroid for each cluster includes an average rating value for each of the items.

20. The method of claim 16, wherein the request is a purchase of a second item.

\* \* \* \* \*